June 3, 1958   E. B. FERNBERG   2,837,184
BEADING FASTENER
Filed Jan. 26, 1956
FIG. 5.
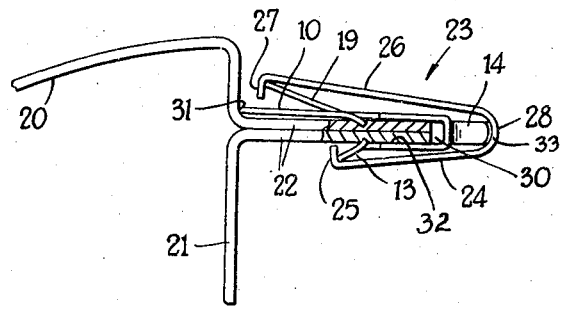
FIG. 3.   FIG. 2.   FIG. 4.
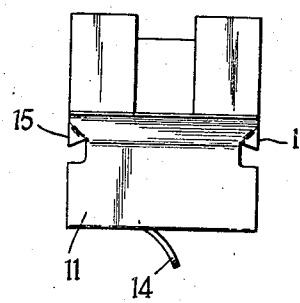 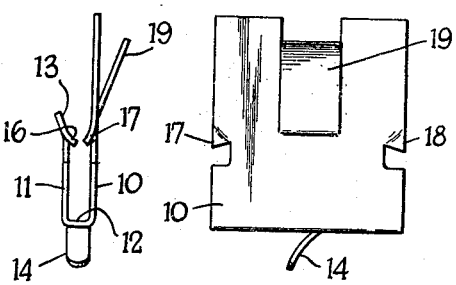
FIG. 1.
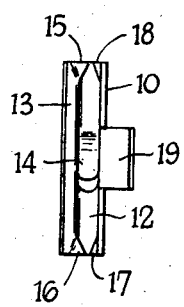
Inventor
Eric Birger Fernberg
by Malcolm W. Fraser
attorney United States Patent Office 2,837,184
Patented June 3, 1958

2,837,184

BEADING FASTENER

Eric Birger Fernberg, Northwood, England

Application January 26, 1956, Serial No. 561,570

3 Claims. (Cl. 189—88)

The present invention relates to an improved fastener and is particularly suitable for securing a beading of U-section to the edge of a metal panel.

It is common practice at the present time in the automobile industry to hide the joint between two longitudinal meeting edges of a metal panel with the aid of chromium plated beading and it is an object of this invention to provide improved means for securing such a beading to the joined edges of the two panels.

A preferred form of the invention will now be described with reference to the accompanying diagrammatic drawings, in which:

Figure 1 is an under-plan of a fastener,

Figures 2, 3 and 4 are respectively side, front and rear elevations of the fastener, and Figure 5 is an elevation, partly in section, of a U-shaped beading secured to a flange of an automobile with the aid of the clip shown in Figures 1 to 4.

The clip illustrated is formed by shearing and bending a single strip of metal. During its fabrication a rectangular strip of metal is bent to generally U-shape so as to have a longer limb 10, a shorter limb 11 and a base 12. The free end of the shorter limb 11 is outwardly flared as at 13.

Out of the base 12 of the fastener is sheared and bent an outwardly directed tongue 14.

Out of the shorter limb 11 are sheared and bent two prongs 15 and 16 which are directed inwardly and towards the base of the fastener, whilst from the longer limb 10 are sheared and bent two prongs 17 and 18 also directed inwardly and towards the base of the fastener. Sheared and bent out of the longer limb 10 is a central resilient catch 19, directed outwardly and away from the base 12.

The fastener, when finally fabricated to the shape illustrated, is rendered resilient and rustproof in any known or suitable manner.

In Figure 5 are shown two panels 20 and 21 of an automobile body, which panels are brought together and united to form an outwardly directed flange 22. In order to hide the flange there is secured over it a beading of U-section which is indicated generally at 23 and which has a shorter side 24 with an inwardly directed rim 25 and a longer side 26 also with an inwardly directed rim 27 and a head 28.

The length of the flange 22 from left to right with respect to Figure 5 is not accurately constant, with the result that it is undesirable to locate the beading 23 on the flange merely by pressing it against the outer end of the flange. Instead, a plurality of the fasteners illustrated are pushed by hand (or otherwise) on to the flange at spaced intervals along its length. The length of the longer limb 10 of each fastener is a little longer than the maximum length of the flange so that there is always a small clearance at the point 30 when the limb 10 is fully home against the panel 20 as at the position 31. As each clip is pushed on to the flange, the prongs 15, 16, 17 and 18 firmly grip the flange and prevent the fastener from being pulled off the flange except with the exercise of considerable force.

Then the beading 23 is pushed over the spaced fasteners until the rim 27 snaps over each catch 19 and the rim 25 snaps over the outwardly flaring end 13 of each fastener.

It will be seen that the fasteners are located on the flange by virtue of the length of the longer limb 10 and the contact made at the positions 31 and 32. Similarly, the beading is located on the several fasteners primarily by contact made at 33 between the head 28 of the beading and each tongue 14, whilst the beading is prevented from coming off the fasteners by engagement between the rims 25 and 27 of the beading and, respectively, the catch 19 and the member 13 of each fastener. The tongue 14 also serves the purpose of locating the beading and holding it steady in the up and down direction, referring to Figure 5.

The clearance shown in Figure 5 between the rim 27 and panel 20 is rather more than would be allowed in practice.

What I claim is:

1. An assembly of a fastener, an edge and a beading of U-section formed with one limb longer than the other and with internal rims, wherein the fastener comprises a single strip of spring metal bent to U-shape so as to have longer and shorter limbs and a base, formed in at least one limb prongs directed inwardly and towards the base, formed in the longer limb a catch directed outwardly and away from the base and formed in the base a tongue directed outwardly of the fastener, the fastener being engaged over the edge, and the beading over the fastener, the rims of the beading being located under the catch and shorter limb respectively, the prongs of the fastener biting into the edge and the tongue bearing against the inside of the beading.

2. An assembly as claimed in claim 1, in which the edge is in the form of a flange of length less than that of the longer limb of the fastener.

3. An assembly as claimed in claim 1 in which the length from the free end of the longer limb of the fastener to the tip of the tongue is greater than the length of the longer limb of the beading.

References Cited in the file of this patent

UNITED STATES PATENTS

| | | |
|---|---|---|
| 2,105,706 | Stamey | Jan. 18, 1938 |
| 2,148,848 | Wiley | Feb. 28, 1939 |
| 2,216,219 | Wiley | Oct. 1, 1940 |